United States Patent [19]

Nestler et al.

[11] Patent Number: 5,757,665
[45] Date of Patent: May 26, 1998

[54] RIVERINE COMMUNITY HABITAT ASSESSMENT AND RESTORATION METHODLOGY

[75] Inventors: John M. Nestler, Vicksburg, Miss.; Peter N. Johnson, North Bonneville, Wash.

[73] Assignee: The United States of America as represented by the Secretary of the Army, Washington, D.C.

[21] Appl. No.: 659,128

[22] Filed: Jun. 4, 1996

[51] Int. Cl.$^6$ .................................................. G06F 19/00
[52] U.S. Cl. .................................................. 364/509; 405/36
[58] Field of Search .................................. 364/509, 510; 405/36, 37, 39, 52, 80

[56] References Cited

U.S. PATENT DOCUMENTS

| | | |
|---|---|---|
| 3,331,207 | 7/1967 | McGrew et al. ........................ 61/1 |
| 3,461,674 | 8/1969 | Katzer et al. .......................... 61/2 |
| 4,255,787 | 3/1981 | Hoffmann et al. ................... 364/494 |

*Primary Examiner*—James P. Trammell
*Attorney, Agent, or Firm*—Luther A. Marsh

[57] ABSTRACT

A method of producing quantitative criteria for optimizing river water resources under variable flow conditions is described. The method includes calculating a bivariate frequency distribution from data representing flow conditions of a target reach of river, calculating a bivariate frequency distribution from data representing flow conditions of a standard reach of river, and comparing the target frequency distribution with the standard frequency distribution, thereby to assess the degree of similarity between the target flow conditions and the standard flow conditions. The similarity coefficients serve as the criteria by which water resource decisions are made. Ecosystem level impacts are defensibly assessed while optimizing water resource allocation.

4 Claims, 1 Drawing Sheet

RIVERINE COMMUNITY HABITAT ASSESSMENT AND RESTORATION METHODLOGY

BACKGROUND OF THE INVENTION

The present invention relates to river assessment and management and, more particularly, to a method for evaluating various river water allocation scenarios so that decisions on how to optimally utilize the water resources can be made.

Faced with increased demands on the natural resources of our river systems, there exists the need for a predictive tool which allows decision makers to make objective choices on how best to utilize these resources and assess the relative effects of varying flow alternatives. Well informed decisions are necessary to continue fostering economic development while simultaneously protecting environmental quality. Decisions must optimize competing needs uses (e.g. hydropower facilities, municipal water supplies, fishing and other recreational activities) without compromising the biological integrity of the system. Without such a decision support tool, investigators cannot develop and document reservoir operation plans that optimize economic and natural resource benefits.

BRIEF DESCRIPTION OF THE PRIOR ART

A known method used to assess the impact of stream regulation and water diversion on aquatic biota is the Instream Flow Incremental Methodology (IFIM). Most applications of the IFIM couple cell-by-cell hydraulic conditions, such as depth, velocity, substrate, and cover, to life-stage specific suitability information in order to generate relationships between discharge and habitat. Limitations of this method include a heavy reliance on cold water river hydrology. The Western Mountain Stream Region, where the method was developed, has lotic systems characterized by high predictability in both the timing and magnitude of seasonal flow patterns compared to other regions of the U.S. Application of the IFIM in regions characterized by less predictable flow regimes has been problematic. Development of suitability criteria information for each life stage of each species within a species rich watershed is a labor intensive, daunting task. Some systems in the southeastern United States may support 100 or more species. In addition, IFIM is considered too simplistic, having minimal technical merit and is, therefore, incapable of providing defensible input for decision makers.

Another known method examines depth and velocity conditions separately. Most researchers are of the opinion that depth and velocity should be treated as a single bivariable.

The U.S. patent to Katzer et al U.S. Pat. No. 3,461,674 discloses a process which can be used to deepen or divert rivers or to control the river contour. The process includes contacting river bed-load solids (those larger or denser solids found moving along river bottoms) with a gas, whereby these solids are floated up into the river current and carried to a settling zone.

The U.S. patent to McGrew et al U.S. Pat. No. 3,331,207 discloses a method and system for collecting and distributing water and particularly, natural precipitation into retention areas where the collected and recovered moisture is retained and released later for the use or benefit of inhabitants of the collection or drainage area.

The U.S. patent to Hoffman et al U.S. Pat. No. 4,255,787 discloses a method and apparatus for controlling and coordinating the power generated by a combined system of thermal units and hydro plants. The method includes determining the water allocation for each plant as it affects the amount of water flowing down a river system.

None of the prior art provides a method of accurately assessing various water allocation scenarios for a river so that the scenario which optimally utilizes the water can be selected and implemented.

SUMMARY OF THE INVENTION

Accordingly, a primary object of the present invention is to provide a method for generating sound objective criteria for optimally allocating river water resources.

It is a more specific object of the invention to provide a method for producing criteria for optimally allocating river water which combines river depth and flow velocity parameters into a bivariate frequency distribution. Bivariate frequency distributions are calculated for both a target reach and a standard reach of river. Similarity coefficients are calculated based on the respective bivariate frequency distribution for all flows. The similarity coefficients and corresponding flow values are then displayed in a manner which allows decision makers to evaluate the impact of the various flow allocation scenarios.

It is another object of the invention to provide a method for producing criteria for optimally allocating river water which calculates a similarity coefficient between the bivariate frequency distribution for a standard reach and a target reach according to the dissimilarity Canberra metric coefficient.

BRIEF DESCRIPTION OF THE DRAWINGS

Other objects and advantages of the invention will become apparent from a study of the following specification when viewed in light of the accompanying drawing, in which.

DETAILED DESCRIPTION

Figure 1:
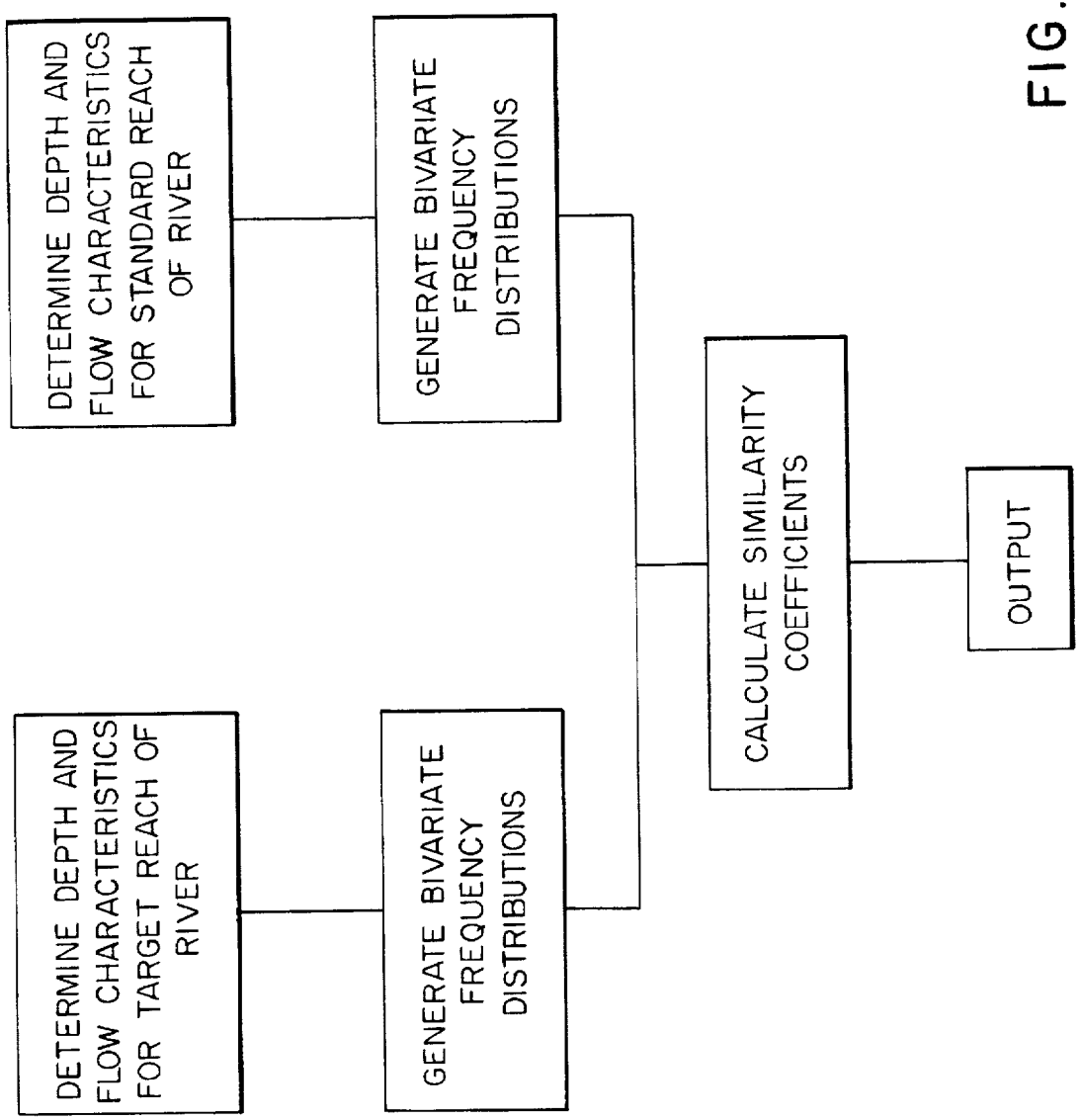
FIG. 1 is a flow chart of the method according to the invention.

Referring to FIG. 1, there is shown a flow chart of the Riverine Community Habitat Assessment and Restoration Methodology (RCHARM). First, the physical habitat conditions or characteristics of a target reach of river or stream for a range of flows are determined. The target reach is the stretch of river being evaluated and whose conditions vary depending on the flow scenario. These characteristics are typically in the form of depth and velocity parameters which are combined into a bivariate frequency distribution. In a similar manner, physical habitat conditions for a standard reach of river are determined. The standard reach is a site having an ideal channel configuration and flow variation. Standard sites can be determined from the drainage of the target site, a nearby river system, or can be the target site evaluated with historical mean flows.

The physical habitat conditions for the target reach are then assessed by examining the extent to which they resemble the physical habitat conditions of the standard reach. This comparative analysis is performed using appropriate time step and hydrologic summary information, such as daily, monthly mean, or median flows. The frequency distributions for the target sites that most closely resemble the standard conditions have the highest habitat values. The degree of similarity between the target site and standard site is determined using quantitative resemblance indices, such as the Canberra metric coefficient, as described below.

The results of the comparative analysis yields an output which may be in the form of look-up tables, plots, or graphs that relate the similarity of the physical habitat conditions associated with each alternative flow for the target reach to the physical habitat conditions of the standard reach. The output, which in effect ranks the alternative flow conditions of the target as they compare with standard conditions, provides resource managers and planners simple criteria by which sound decisions regarding resource and economic optimization can be made.

Application of the method requires the following inputs for both the target and standard sites: (1) cross-sectional bed elevation profiles with velocity measurements; (2) hydrologic records that summarize flow conditions; and (3) stage-discharge relationships.

Several transects, usually 5-7 cross-sectional sample areas of the river, are used to characterize each site. The transects are chosen to ensure representation of all channel types, such as shoals and pools, within the respective reaches. For each transect, water surface elevation is initially recorded and monitored for change during the course of the gaging survey. Bed elevations, velocity measurements and substrate/cover measurements are taken along the transect at selected increments (or verticals) chosen by the gager to reflect changes in either channel substrate or velocity. Discharge per transect is then estimated using the velocity and bed elevation data.

Hydrologic records on a site specific basis are produced using hydrographic data from U.S.G.S. and Army Corps of Engineers gaging stations. For example, the hydrologic summary variable may be the mean summer flow of the river over the past 40 years.

Transect specific stage-discharge relationships are usually derived from predictive hydraulic models but may also be based on staff gage readings. The site is later revisited to obtain readings during a higher (or lower) flow period. Recording additional velocity measurements when revisiting the sites during periods of higher (or lower) flows is recommended since this additional data set can be used to calibrate the velocities at higher (or lower) simulated flows.

Next, depth and velocity conditions for specified flows for both the target and standard reaches are predicted using a hydraulic simulation program (referred to as IFG-4) which is contained in the Physical Habitat Simulation System developed by the U.S. Fish and Wildlife Service. The IFG-4 program calculates velocity patterns for each of the specified flows by solving Manning's equation for Manning's n within various cells using the measured velocities. Cell boundaries are defined as halfway between adjacent verticals. The calculated cell-specific n values are then used to generate estimates of velocities for each cell over a range of simulated discharges.

After estimating a lateral velocity pattern based on the calculated Manning's n, the IFG-4 program checks the calculated water surface elevation against the given water surface elevation provided by the stage-discharge relationship. If necessary, the IFG-4 program modifies all cell velocities by a common factor to raise or lower the estimated water surface elevation until it matches the given water surface elevation.

The output from the IFG-4 program is then further manipulated by rounding the depth and velocity values to appropriate intervals. The resolution of the rounding criteria should correspond to levels relevant to both the river biota and the objectives of the study. Transects per site are then merged to form individual data sets for each flow so that river reaches can be evaluated on a flow-specific basis. Other standard hydraulic simulation methods that generate cell-by-cell depth and velocity information can also be used.

In accordance with a characterizing feature of the invention, frequency distributions of the depth and velocity values for the flow-specific data sets are then calculated. In this way, depth and flow velocity values are combined and represented by a single percent frequency bivariable. As such, the depth and velocity conditions used in the comparative analysis (discussed below) represent the relationship between these two physical variables. The advantage of using a bivariate approach which links depth and velocity over a univariate approach which analyzes depth and velocity distributions separately is that the former more truly reflects system level integrity. Aquatic biota do not respond to just depth or just velocity, but to the interrelated depth and velocity patterns existing in the system. Such a bivariate frequency distribution may, for example, look like:

| Depth (cm) Frequency | Velocity (cm/sec) | Percent |
|---|---|---|
| 10 | 0 | 1.45 |
| 10 | 10 | 0.68 |
| 10 | 20 | 0.00 |
| 10 | 30 | 0.68 |
| 10 | 40 | 0.00 |
| 10 | 50 | 1.19 |
| 10 | 60 | 0.00 |
| 10 | 70 | 0.00 |
| 10 | 80 | 0.00 |
| 10 | 90 | 0.00 |
| 10 | 100 | 0.00 |
| 20 | 0 | 0.63 |
| 20 | 10 | 2.47 |
| 20 | 20 | 0.51 |
| 20 | 30 | 1.37 |
| 20 | 40 | 1.02 |
| 20 | 50 | 1.02 |
| 20 | 60 | 0.00 |
| 20 | 70 | 0.00 |
| 20 | 80 | 0.00 |
| 20 | 90 | 0.00 |
| 20 | 100 | 0.00 |
| 30 | 0 | 2.22 |
| 30 | 10 | 1.88 |
| . | . | . |
| . | . | . |
| . | . | . |

Contour plots of depth-velocity frequency distributions for each flow are generated to visually illustrate the quality and relative quantity of habitat available to the aquatic communities.

A habitat value for each flow alternative is then calculated by comparing the predicted frequency distribution of depths and velocities of the target flows to those associated with the standard conditions. Frequency distributions that most closely resemble the standard conditions are assigned the highest habitat values. The degree of similarity between the target and the standard is evaluated by using quantitative resemblance indices. One suitable index is the Canberra metric coefficient because its resemblance value reflects high and low scoring attributes evenly. It will be recognized that various other similarity and dissimilarity metrics are available. The Canberra metric coefficient is based on the average of a series of fractions relating to inter-entity resemblance, thus having inherent attribute standardization. The dissimilarity Canberra metric coefficient has the form: where $A_{jk}$=Canberra metric coefficient;

n=total number of attributes excluding all double zero matches;

$X_{ij}$=standard percent frequency distribution per depth-velocity increment;

$X_{ik}$=target percent frequency distribution per depth-velocity increment.

Similarity coefficients are generated across the range of flow scenarios for the target site(s). Functional relationships between habitat value and flow are then produced for each target site. These functional relationships are displayed in the form of habitat value—flow curves or may be presented in tables of similarity coefficients and flow. The tables or graphs are the final output of the method and serve as the criterion for water issue decision makers. This analysis provides information useful at a system level of impact assessment by identifying major differences in habitat between target and standard conditions. Resource use can be optimized without compromising the integrity of the biota by using information gleaned from this new assessment methodology.

While in accordance with the provisions of the Patent Statutes the preferred forms and embodiments of the invention have been illustrated and described, it will be apparent to those of ordinary skill in the art that various changes and modifications may be made without deviating from the inventive concepts set forth above.

What is claimed is:

1. A method for optimizing river water resources under variable flow conditions, comprising the steps of:

(a) defining a target position of a river for which water resources are to be apportioned;

(b) measuring the water depth and velocity within said target position;

(c) combining said target portion water depth and velocity measurements to produce a target bivariable;

(d) defining a reference portion of the river;

(e) measuring the water depth and velocity within said reference portion;

(f) combining said reference portion water depth and velocity measurements to produce a reference bivariable;

(g) comparing said target and reference bivariables to determine similarity coefficients therebetween; and (h) analyzing said similarity coefficients to predict the optimum usage of water within said target portion.

2. A method as defined in claim 1, wherein said analyzing step comprises frequency analysis, whereby when a habitat value for each resource alternative within said target portion is identified by a predicted frequency distribution, the predicted frequency distributions for each resource can be compared with a reference frequency distribution to determine the optimum resource within the target portion.

3. A method as defined in claim 2, wherein said comparing step uses similarity metrics.

4. A method as defined in claim 3, wherein the degree of similarity between said target and reference bivariables is evaluated using qualitative resemblance indices.

* * * * *